US010678385B2

(12) United States Patent
Sakamoto et al.

(10) Patent No.: US 10,678,385 B2
(45) Date of Patent: Jun. 9, 2020

(54) INSPECTING APPARATUS

(71) Applicant: NIDEC-READ CORPORATION, Kyoto (JP)

(72) Inventors: Koji Sakamoto, Kyoto (JP); Toshihide Matsukawa, Kyoto (JP); Koji Iwami, Kyoto (JP); Shigeki Fujita, Kyoto (JP); Osamu Hikita, Kyoto (JP)

(73) Assignee: NIDEC-READ CORPORATION, Kyoto (JP)

( * ) Notice: Subject to any disclaimer, the term of this patent is extended or adjusted under 35 U.S.C. 154(b) by 126 days.

(21) Appl. No.: 15/680,272

(22) Filed: Aug. 18, 2017

(65) Prior Publication Data

US 2017/0344159 A1 Nov. 30, 2017

Related U.S. Application Data

(63) Continuation of application No. 14/606,043, filed on Jan. 27, 2015, now abandoned.

(30) Foreign Application Priority Data

Jan. 27, 2014 (JP) .................................. 2014-012396

(51) Int. Cl.
*G06F 3/044* (2006.01)
*G06F 11/22* (2006.01)
(Continued)

(52) U.S. Cl.
CPC .......... *G06F 3/044* (2013.01); *G06F 3/03545* (2013.01); *G06F 3/0414* (2013.01); *G06F 11/2221* (2013.01)

(58) Field of Classification Search
CPC .. G06F 11/2221; G06F 3/044; G06F 3/03545; G06F 3/0414
See application file for complete search history.

(56) References Cited

U.S. PATENT DOCUMENTS

| 5,308,132 A | 5/1994 | Kirby et al. |
| 7,756,673 B2 | 7/2010 | Liu et al. |

(Continued)

FOREIGN PATENT DOCUMENTS

| CN | 1086323 A | 5/1994 |
| CN | 101145122 A | 3/2008 |

(Continued)

OTHER PUBLICATIONS

Office Action received for Chinese Patent Application No. 201510028620.0 dated May 31, 2018, 5 pages and 8 pages of English translation.

(Continued)

*Primary Examiner* — Jeff Piziali (74) *Attorney, Agent, or Firm* — Viering, Jentschura & Partner MBB (57) ABSTRACT

An inspection apparatus is provided with a holder configured to set an inspection target thereon, the inspection target configured to detect a contact position on the inspection target touched by a human finger; pseudo finger(s) configured to be detected as the human finger upon contact with the inspection target; a positioner configured to move the pseudo finger(s) relative to the inspection target and to change the contact position of the pseudo finger(s) relative to the inspection target; a memory configured to store, respectively, a value of a pressing force in a range of pressing forces said range including a zero pressing force for each of the pseudo finger(s) on the inspection target; a controller configured to regulate the pressing force for pseudo finger(s) of the pseudo finger(s) based on the respective value; and a sensor configured to acquire an electric signal output from the inspection target.

5 Claims, 3 Drawing Sheets

(51) Int. Cl.
*G06F 3/0354* (2013.01)
*G06F 3/041* (2006.01)

(56) References Cited

U.S. PATENT DOCUMENTS

| | | | |
|---|---|---|---|
| 7,797,850 B2 | 9/2010 | Hon et al. | |
| 8,009,148 B2 * | 8/2011 | Chien | G06F 3/0416 |
| | | | 345/173 |
| 8,872,779 B2 * | 10/2014 | Chen | G06F 3/0418 |
| | | | 178/18.01 |
| 8,988,087 B2 * | 3/2015 | Uzelac | G01R 31/28 |
| | | | 324/686 |
| 9,134,869 B2 * | 9/2015 | Yeh | G06F 3/044 |
| 9,213,057 B2 * | 12/2015 | Chen | G01R 31/28 |
| 9,298,312 B2 * | 3/2016 | Kuznetsov | G06F 3/0418 |
| 9,310,900 B1 * | 4/2016 | Kumar | G06F 3/03545 |
| 9,317,147 B2 * | 4/2016 | Welch | H04N 17/00 |
| 9,446,519 B2 * | 9/2016 | Gray | B25J 9/1679 |
| 2003/0189555 A1 * | 10/2003 | Yamashita | G06F 3/041 |
| | | | 345/173 |
| 2008/0068229 A1 | 3/2008 | Chuang | |
| 2009/0160788 A1 * | 6/2009 | Chien | G06F 3/0416 |
| | | | 345/173 |
| 2012/0280934 A1 | 11/2012 | Ha et al. | |
| 2013/0227348 A1 | 8/2013 | Stephenson et al. | |
| 2013/0278550 A1 * | 10/2013 | Westhues | G06F 3/03545 |
| | | | 345/174 |
| 2013/0345864 A1 | 12/2013 | Park | |

FOREIGN PATENT DOCUMENTS

| | | |
|---|---|---|
| CN | 101358830 A | 2/2009 |
| CN | 101532818 A | 9/2009 |
| JP | 2005315780 A | 11/2005 |
| JP | 2010250557 A | 11/2010 |
| JP | 2013073287 A | 4/2013 |
| JP | 2013174939 A | 9/2013 |

OTHER PUBLICATIONS

Japanese Office Action based on Application No. 2014-012396 (6 Pages) dated Aug. 31, 2017 (Reference Purpose Only).
Office Action received for Chinese Patent Application No. 201510028620.0 dated May 31, 2018, 7 pages and 3 pages of English translation.
Office Action received for U.S. Appl. No. 14/606,043 dated Dec. 12, 2017, 29 pages.

* cited by examiner

INSPECTING APPARATUS

CROSS REFERENCE TO RELATED APPLICATION

This application is a continuation application from U.S. application Ser. No. 14/606,043, filed on Jan. 27, 2015, which claimed the benefit of Japanese Patent Application No. 2014-012396, filed on Jan. 27, 2014, the contents of which are hereby incorporated by reference in their entirety.

BACKGROUND

Technical Field

This disclosure relates to a configuration of an apparatus for inspecting a touch panel.

Related Art

With the recent rapid widespread use of electronic appliances such as a smartphone and a tablet, there is an increasing demand for touch panel devices configured to detect a position touched by a human finger or with a stylus pen. Examples of the touch panel device include an electrostatic capacitance touch panel device, a pressure-sensitive resistive film touch panel device, and the like.

A recent stylus pen has been provided with a pressure-sensitive sensor to realize a so-called writing pressure sensing function. A combination of this pressure-sensitive pen with a touch panel device allows a process of changing a reaction based on a difference in writing pressure even when the same position is touched. As a result, this combination allows more intuitive operation of an electronic appliance.

It is considerably important for touch panel device manufacturers to conduct inspection on touch panel devices (sensor panels) for the purpose of avoiding defectives from being mixed in non-defectives to thereby ensure the product quality. For this reason, various touch panel inspecting apparatuses have been proposed.

For example, JP 2003-303051 A discloses a touch panel inspection device for evaluating the destruction durability performance of a so-called pressure-sensitive touch panel using a resistance film. The touch panel inspection device includes a pen member configured to slide on a panel surface of a touch panel. The pen member has a first end for pressing the touch panel, and a second end which is an opposite end to the first end, the second end provided with a weight corresponding to weighting means having a predetermined weight.

The touch panel inspection device disclosed in JP 2003-303051 A is configured to evaluate the destruction durability performance of a touch panel, but is not configured to determine whether or not a touch panel is a defective. However, the configuration disclosed in JP 2003-303051 A allows optional settings for pressure of the pen member pressed against the panel surface of the touch panel, which leads to further diversification of the inspection methods.

According to some of recent techniques which have been proposed, a sensor of a stylus pen does not sense writing pressure, but a touch panel device senses pressure of a touch. Examples of such a technique include a technique of combining an electrostatic capacitance touch panel with a pressure sensor and a technique of forming a touch panel using a material whose characteristics vary depending on a mechanical load, and the potentials of these techniques have been under review.

The technique capable of sensing pressure of a touch using a touch panel allows sensing of a difference in pressure in addition to a position touched by a finger without using a dedicated stylus pen, when being put to practical use. Therefore, this technique can be expected to further improve user's convenience.

In order to inspect whether or not such a pressing force sensitive touch panel correctly operates, it is necessary to bring a pseudo finger into press contact with the touch panel while changing pressing force, and to examine electrical signals in the touch panel.

However, if the inspection device disclosed in JP 2003-303051 A is adapted to conduct this inspection, a weight is replaced by a different one each time the pressing force of the pen member is changed, so that the inspection efficiency is considerably degraded.

In the inspection device disclosed in JP 2003-303051 A, moreover, when the pen member is brought into contact with the touch panel, the self weights of at least the pen member, the weight, and an arm member that supports the weight are acted on the contact. For this reason, weakening the pressing force has a ceiling and, in actual fact, the inspection device cannot fill a need to inspect operation of the touch panel which is touched with considerably light force such as approximately zero gram.

SUMMARY

In view of the circumstances described above, an exemplary embodiment of the disclosure provides a touch panel inspecting apparatus having a configuration capable of inspecting a touch panel while easily and flexibly changing force to bring a pseudo finger into contact with the touch panel.

The technical challenges to be solved by the disclosure are as described above. Hereinafter, a description will be given of solutions to these technical challenges and the advantageous effects of the solutions.

An exemplary embodiment of the disclosure provides a touch panel inspecting apparatus having the following configuration. The touch panel inspecting apparatus includes a holding part, a pseudo finger, a contact position changing part, a set pressing force memory part, a pressing force regulating part, and an acquiring part. The holding part is configured to allow a touch panel, which is an inspection target, to be set thereon. The pseudo finger is configured to be contactable with the touch panel set on the holding part. The contact position changing part is configured to move the pseudo finger relative to the touch panel and to change a contact position of the touch panel with the pseudo finger. The set pressing force memory part is configured to store a set value of pressing force of the pseudo finger, in a changeable manner. The pressing force regulating part is configured to regulate the pressing force to bring the pseudo finger into contact with the touch panel, based on the set value stored in the set pressing force memory part. The acquiring part is configured to acquire an electric signal output from the touch panel.

Thus, the touch panel inspecting apparatus can inspect the touch panel, based on the electric signal acquired by the acquiring part, while easily and flexibly changing the force to bring the pseudo finger into contact with the touch panel, by changing the set value stored in the set pressing force memory part. Accordingly, the touch panel inspecting apparatus can quickly address a change of a touch panel to be inspected, a change of inspection conditions, and the like, and therefore can considerably improve inspection efficiency.

Preferably, the touch panel inspecting apparatus further includes a weight canceling part configured to apply, to the pseudo finger, force to bring the pseudo finger apart from the touch panel.

Thus, the touch panel inspecting apparatus can bring the pseudo finger into contact with the touch panel with force lighter than the self weight of the pseudo finger. Accordingly, the touch panel inspecting apparatus can inspect the touch panel under wider conditions than ever before.

In the touch panel inspecting apparatus, preferably, the set pressing force memory part is capable of storing a set value corresponding to zero pressing force of the pseudo finger.

Thus, the touch panel inspecting apparatus can bring about a state in which the pseudo finger is in contact with the touch panel with the zero pressing force. Accordingly, the touch panel inspecting apparatus can inspect the touch panel in a special state in which a mechanical load to be applied to the touch panel is substantially eliminated.

Preferably, the touch panel inspecting apparatus has the following configuration. The touch panel inspecting apparatus further includes a housing, a bearing-forming gas passage, a thrust gas passage, and a canceling gas passage. The housing has an accommodating chamber for accommodating the pseudo finger, and is configured to support the pseudo finger so as to allow the pseudo finger to move linearly. The bearing-forming gas passage is a passage for a compressed gas to be supplied for forming a hydrostatic gas bearing between the housing and the pseudo finger. The thrust gas passage is a passage for a compressed gas to be supplied for acting, on the pseudo finger, force to bring the pseudo finger close to the touch panel. The canceling gas passage is a passage for a compressed gas to be supplied for acting, on the pseudo finger, the force to bring the pseudo finger apart from the touch panel. The pressing force regulating part controls at least one of pressure of the compressed gas supplied to the thrust gas passage and pressure of the compressed gas supplied to the canceling gas passage to regulate the pressing force to bring the pseudo finger into contact with the touch panel.

Thus, the touch panel inspecting apparatus forms the hydrostatic gas bearing to substantially eliminate the slide friction of the pseudo finger and to control the gas pressure at the thrust gas passage or the canceling gas passage, thereby easily and flexibly regulating the pressing force of the pseudo finger. Moreover, the touch panel inspecting apparatus can easily bring about a state in which the pseudo finger is in contact with the touch panel with considerably weak pressing force (or zero pressing force), by the differential control using the pressure at the thrust gas passage and the pressure at the canceling gas passage.

Preferably, the touch panel inspecting apparatus has the following configuration. The touch panel inspecting apparatus includes the plurality of pseudo fingers. The pressing force regulating part is capable of regulating, for each pseudo finger, the pressing force to bring the pseudo finger into contact with the touch panel.

Thus, the touch panel inspecting apparatus can inspect the touch panel by bringing the plurality of pseudo fingers into contact with the touch panel simultaneously, and therefore can efficiently conduct the inspection.

The foregoing and other objects, features, aspects, and advantages of the disclosed invention will become more apparent from the following detailed description, when taken in conjunction with the accompanying drawings.

DETAILED DESCRIPTION

Figure 1:
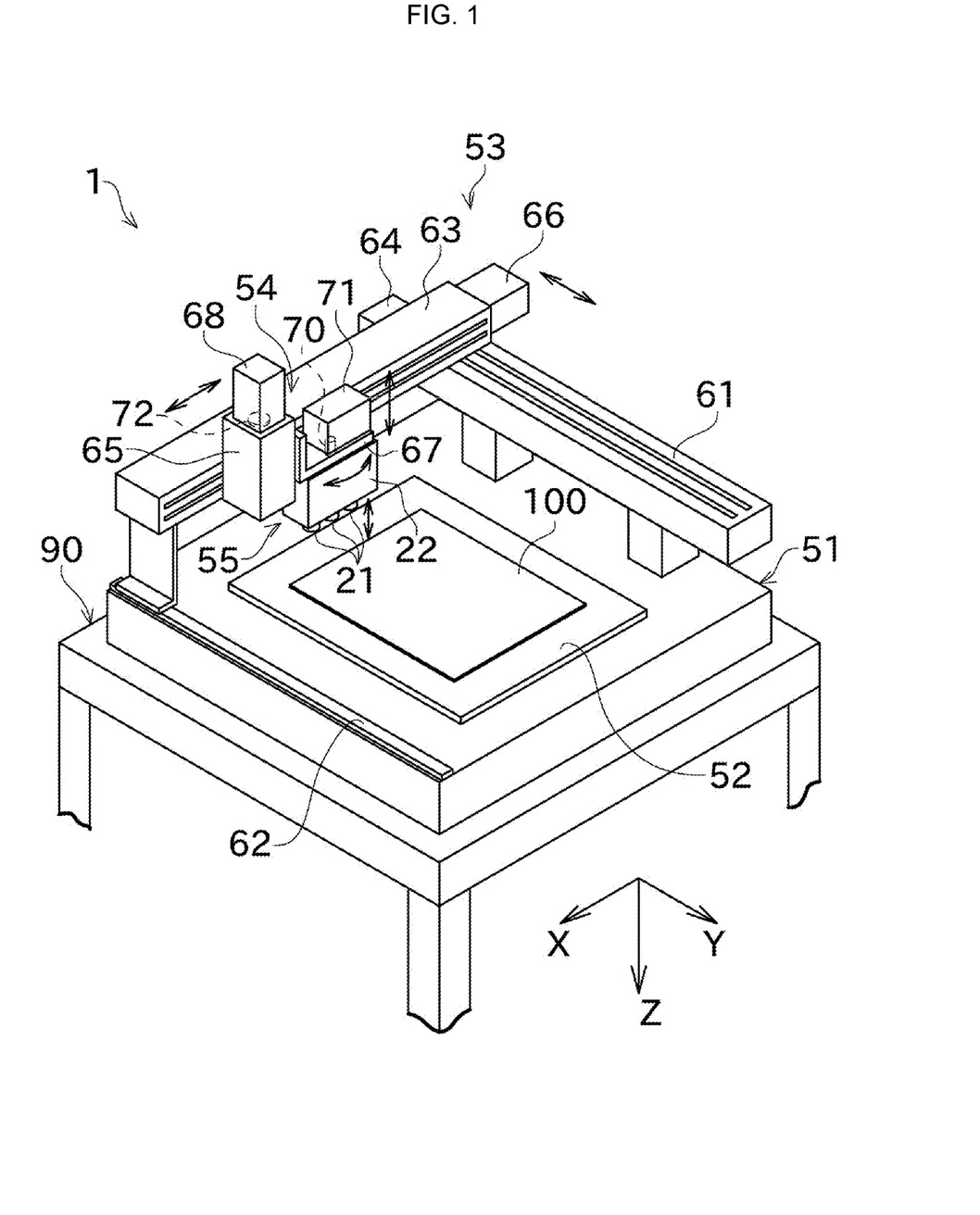
FIG. 1 is a schematic perspective view illustrating an overall configuration of a touch panel inspecting apparatus according to an exemplary embodiment.

Various embodiments of the disclosure will be described below with reference to the drawings. FIG. 1 is a schematic perspective view illustrating an overall configuration of a touch panel inspecting apparatus 1 according to an exemplary embodiment.

The touch panel inspecting apparatus 1 illustrated in FIG. 1 is mounted on a horizontal workbench 90 in active use. The touch panel inspecting apparatus 1 includes a base 51, a workpiece holder (a holding part) 52, an X-Y movement mechanism 53, a Z movement mechanism 54, and a pseudo finger mechanism 55.

The base 51 has a horizontal upper surface, and an X axis and a Y axis which are orthogonal to each other are defined in a plane parallel with the horizontal upper surface. Moreover, a Z axis is defined in a direction perpendicular to the X-Y plane.

The workpiece holder (the holding part) 52 is fixed onto the upper surface of the base 51. The workpiece holder 52 has a horizontal flat plate shape. The workpiece holder 52 has a suction table (not illustrated) capable of fixedly holding a flat plate-shaped touch panel 100, which is an inspection target, with a front surface of the touch panel 100 directed upward. The touch panel 100 has a rectangular shape, and is set on the workpiece holder 52 such that one of orthogonal two sides thereof is in parallel with the X axis and the other side is in parallel with the Y axis.

The X-Y movement mechanism 53 corresponds to a biaxial planar movement mechanism in which two linear guides are combined, and is mounted on the base 51. The X-Y movement mechanism 53 can move the pseudo finger mechanism 55 serving as an inspection head, in the X-Y plane which is parallel with the surface of the base 51 (the surface of the touch panel 100 to be described later). Thus, it is possible to optionally change a position where a pseudo finger 21 of the pseudo finger mechanism 55 comes into contact with the touch panel 100.

The X-Y movement mechanism 53 includes a linear guide 61, a guide rail 62, a first carriage 63, and a second carriage 65.

Each of the linear guide 61 and the guide rail 62 is disposed in a direction parallel with the Y axis. The linear guide 61 and the guide rail 62 are disposed to face each other with the base 51 interposed therebetween in plan view.

The first carriage 63 is disposed to lay over the linear guide 61 and the guide rail 62. The first carriage 63 is disposed in a direction parallel with the X axis and is guided by the linear guide 61 and the guide rail 62 so as to be linearly movable in the Y axis direction. A Y-axis drive motor 64 is attached to the linear guide 61 and is driven to optionally displace the first carriage 63 in the Y-axis direction.

The first carriage 63 is configured to support the second carriage 65. The first carriage 63 constitutes a linear guide and guides the second carriage 65 such that the second carriage 65 can linearly move in the X-axis direction corresponding to the longitudinal direction of the first carriage 63. An X-axis drive motor 66 is attached to the first carriage 63 and is driven to optionally displace the second carriage 65 in the X-axis direction.

The second carriage 65 is configured to support a bracket 67. The second carriage 65 includes a screw feed mechanism (not illustrated) for guiding the bracket 67 such that the bracket 67 can linearly move in the Z-axis direction corresponding to an up-and-down direction. A Z-axis drive motor 68 is attached to the second carriage 65 and is driven to optionally displace the bracket 67 in the Z-axis direction. The screw feed mechanism and the like constitute the Z movement mechanism 54 capable of moving the pseudo finger mechanism 55 in the Z-axis direction.

The pseudo finger mechanism 55 is supported on a lower portion of the bracket 67. The pseudo finger mechanism 55 constitutes the inspection head in the touch panel inspecting apparatus 1 according to an illustrative embodiment, and includes a plurality of (three in an illustrative embodiment) pseudo fingers (each including a movable member, a needle, a contact member) 21 elongated in the up-and-down direction. The three pseudo fingers 21 are linearly arranged at equal intervals (FIG. 1 illustrates the state in which the pseudo fingers 21 are arranged in the X-axis direction). The pseudo finger mechanism 55 can press the three pseudo fingers 21 against the touch panel 100 with preset force.

The pseudo finger mechanism 55 is supported by the bracket 67 via a pivot 70 directed in a perpendicular direction. Accordingly, the pseudo finger mechanism 55 is rotatable about the pivot 70. A turning motor 71 is provided on an upper portion of the bracket 67 and is driven to change an angle of the pseudo finger mechanism 55 (i.e., an arrangement angle of the three pseudo fingers 21) relative to the X and Y axes.

Figure 2:
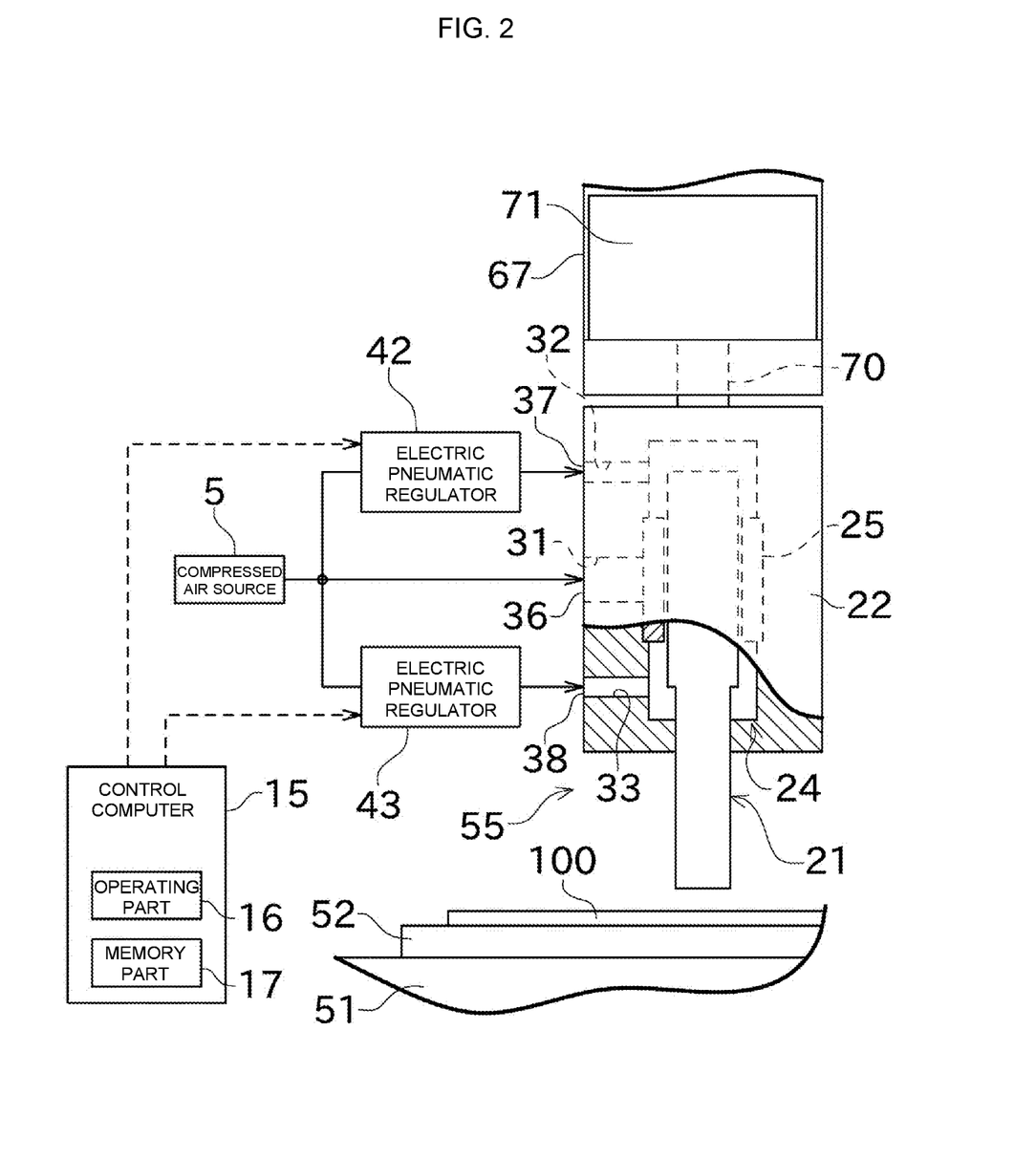
FIG. 2 is a partially conceptual block diagram illustrating a configuration of a pseudo finger mechanism.

With reference to FIG. 2, next, a description will be given of the detailed configuration of the pseudo finger mechanism 55. FIG. 2 is a partially conceptual block diagram illustrating the configuration of the pseudo finger mechanism 55.

The pseudo finger mechanism 55 includes the pseudo fingers 21 described above, and a housing 22 for accommodating these pseudo fingers 21.

The pseudo finger mechanism 55 is formed of a hydrostatic air bearing actuator (a gas bearing actuator), and is capable of supporting the rod-shaped pseudo finger 21 by an air bearing (a gas bearing) in a non-contact manner.

The housing 22 has an accommodating chamber 24 formed therein and is capable of accommodating the pseudo fingers 21. Each of the pseudo fingers 21 formed into the round rod shape elongated in the up-and-down direction has an upper portion inserted into the accommodating chamber 24 and a lower end (a distal end) protruding from the housing 22. The pseudo finger 21 is supported by the housing 22 so as to be displaceable in the up-and-down direction. With this configuration, when the pseudo finger 21 is displaced downward, the lower end of the pseudo finger 21 can be brought into contact with the touch panel 100.

The accommodating chamber 24 is provided with a cylindrical bush 25 made of a porous material, and the pseudo finger 21 is inserted into the bush 25. A small clearance is created between the bush 25 and the pseudo finger 21 in a radial direction. The housing 22 also has a bearing-forming air passage (a bearing-forming gas passage) 31 formed therein. In the housing 22, compressed air (compressed gas) supplied to the bearing-forming air passage 31 passes through a large number of pores in the porous bush 25 and then is uniformly ejected to the clearance between the bush 25 and the pseudo finger 21. The air bearing thus formed holds the pseudo finger 21 in the non-contact manner. As a result, it is possible to reduce, to a negligible degree, sliding resistance generated when the pseudo finger 21 moves up and down relative to the housing 22.

The bearing-forming air passage 31 has a first end opened at the accommodating chamber 24 and a second end (a bearing-forming air port 36) opened at an outer surface of the housing 22. The bearing-forming air port 36 is connected to a compressed air source (a compressed gas supply source) 5 via an appropriate pipe.

In the pseudo finger mechanism 55, the housing 22 also has a thrust air passage (a thrust gas passage) 32 formed therein. The thrust air passage 32 has a first end opened at the accommodating chamber 24 and a second end (a thrust air port 37) opened at the outer surface of the housing 22. The thrust air port 37 is connected via an appropriate pipe to an electric pneumatic regulator 42 for regulating pressure of the compressed air supplied from the compressed air source 5.

In the pseudo finger mechanism 55, the housing 22 also has a canceling air passage (a weight canceling part, a canceling gas passage) 33 formed therein. The canceling air passage 33 has a first end opened at the accommodating chamber 24 and a second end (a canceling air port 38) opened at the outer surface of the housing 22. The canceling air port 38 is connected via an appropriate pipe to an electric pneumatic regulator 43 for regulating the pressure of the compressed air supplied from the compressed air source 5.

Although not illustrated in the drawings, the housing 22 has a discharge passage appropriately formed therein to let the compressed air supplied to each of the bearing-forming air passage 31, the thrust air passage 32, and the canceling air passage 33 escape to the outside.

Each of the two electric pneumatic regulators (the gas pressure regulators) 42 and 43 is electrically connected to a control computer 15 for controlling the operation of the touch panel inspecting apparatus 1.

The electric pneumatic regulator 42 regulates the pressure of the compressed air supplied to the thrust air port 37, to pressure responsive to an electric signal from the control computer 15. Likewise, the electric pneumatic regulator 43 regulates the pressure of the compressed air supplied to the canceling air port 38, to pressure responsive to an electric signal from the control computer 15. This pressure control allows the pseudo finger 21 to linearly move in a direction close to or apart from the touch panel 100. As will be described in detail later, moreover, this pressure control allows regulation of pressing force to press the pseudo finger 21 against the touch panel 100.

The electric pneumatic regulator 42 and the electric pneumatic regulator 43 are of a high resolution type, and therefore can finely regulate the pressure at the thrust air port 37 and the pressure at the canceling air port 38, respectively.

As illustrated in FIG. 1, a load cell 72 corresponding to a load sensor is disposed on the second carriage 65 supporting the pseudo finger mechanism 55. The load cell 72 is configured to measure and output pressing stress of the pseudo finger 21. For example, the measured value of the pressing stress is used for calibrating the pressing force of the pseudo finger 21 in the touch panel inspecting apparatus 1. This calibration allows enhancement of accuracy for controlling the pressing force of the pseudo finger 21.

FIG. 2 illustrates only one of the pseudo fingers 21 as a representative. Actually, the three pseudo fingers 21 are arranged horizontally. The accommodating chamber 24 and the air bearing are formed for each pseudo finger 21.

Moreover, one electric pneumatic regulator 42 and one electric pneumatic regulator 43 are provided for each pseudo finger 21. Accordingly, the three pseudo fingers 21 can be displaced in the up-and-down direction independently of one another, and the pressing forces to press the respective pseudo fingers 21 against the touch panel 100 can also be regulated independently of one another.

Figure 3:
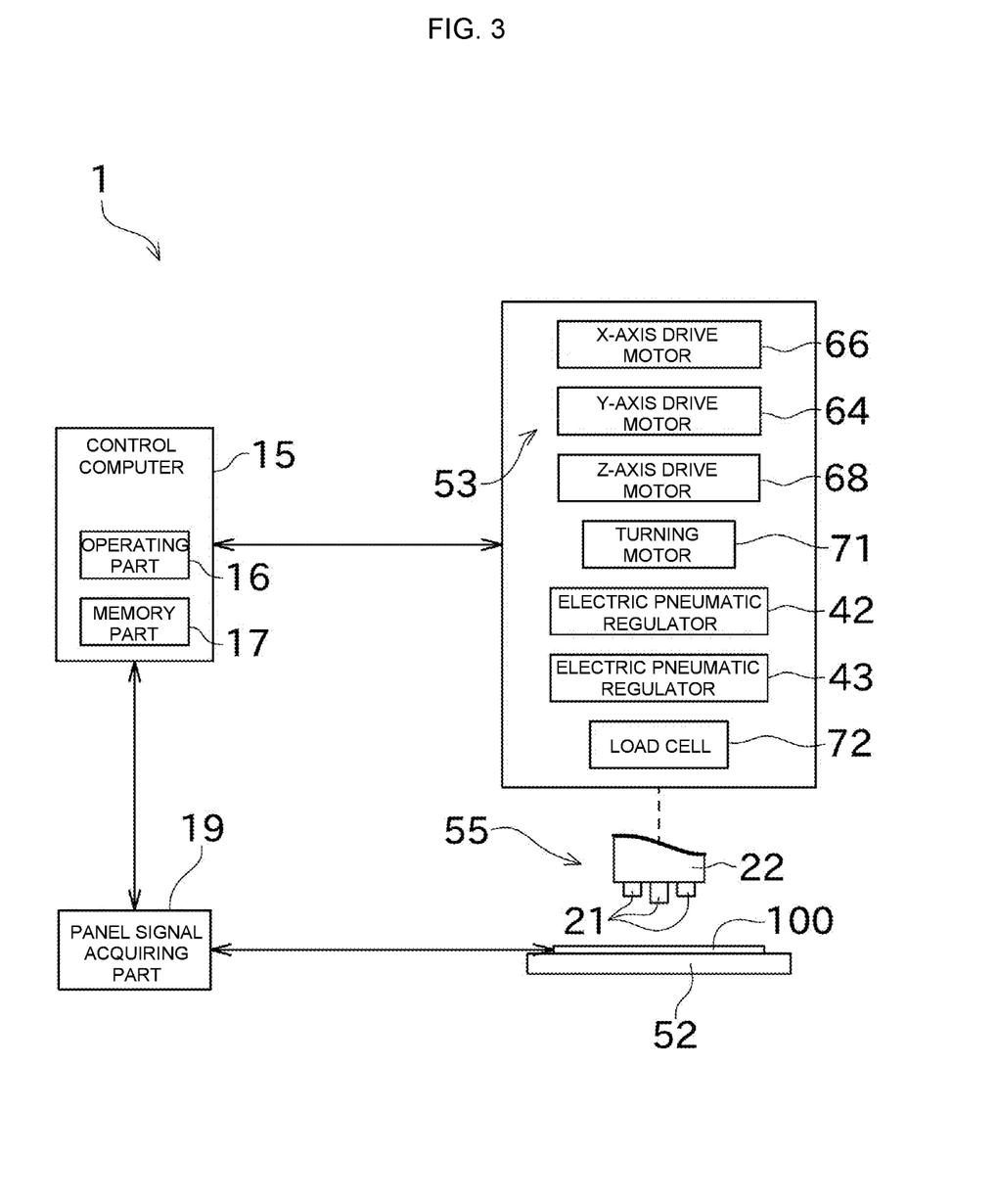
FIG. 3 is a functional block diagram of the touch panel inspecting apparatus.

With reference to FIG. 3, next, a description will be given of an electrical configuration of the touch panel inspecting apparatus 1. FIG. 3 is a functional block diagram of the touch panel inspecting apparatus 1.

The control computer 15 is capable of exchanging signals with the respective constituents of the touch panel inspecting apparatus 1 in order to inspect the touch panel 100. The control computer 15 is capable of sending signals to the X-axis drive motor 66, the Y-axis drive motor 64, the Z-axis drive motor 68, the turning motor 71, and the electric pneumatic regulators 42 and 43 to control these constituents. Moreover, the control computer 15 is capable of acquiring a signal from the load cell 72.

The control computer 15 is electrically connected to a panel signal acquiring part 19 to acquire from the panel signal acquiring part 19 results of detection regarding the contact position of the touch panel 100 with the pseudo finger 21 and the pressing force to press the pseudo finger 21 against the touch panel 100.

In an illustrative embodiment, the control computer 15 corresponds to a personal computer, and is provided with an operating part 16 including a mouse, a keyboard, and the like for setting the operations of the touch panel inspecting apparatus 1; and a memory part 17 including memory devices such as a ROM, a RAM, and an HDD for storing the various settings. A user operates the operating part 16, thereby setting various parameters required for conducting inspection using the touch panel inspecting apparatus 1. The parameters thus set are stored in the memory part 17 of the control computer 15.

Examples of the parameter storable in the memory part 17 may include, but not limited thereto, lengthwise and widthwise dimensions of a touch panel to be inspected; the number of electrodes arranged in a matrix in the touch panel; a pitch between the electrodes arranged in rows; and a pitch between the electrodes arranged in columns.

One of the parameters settable by the user who operates the control computer 15 is the magnitude of the pressing force to press the pseudo finger 21 against the touch panel 100. More specifically, the user operates the operating part 16, thereby inputting and setting the magnitude of the force to press the pseudo finger 21 against the touch panel 100 (the pressing force) within a predetermined range. The magnitude of the pressing force can be stored in the memory part 17. In the case of changing the pressing force, the user operates the operating part 16 to input a new set value of the pressing force. The set value can be newly stored in the memory part 17. Accordingly, the memory part 17 may be referred to as a set pressing force memory part.

In the touch panel inspecting apparatus 1 according to an illustrative embodiment, the range of the pressing force settable by the user includes zero. Specifically, the pressing force may be set within a range of 0 gf (lower limit) to 3 kgf (upper limit) for example. When the pressing force is set at 0 gf, the control computer 15 controls the two electric pneumatic regulators 42 and 43 so as to keep a balance among the force to press the pseudo finger 21 downward by the compressed air supplied to the thrust air port 37, the self weight of the pseudo finger 21, and the force to press the pseudo finger 21 upward by the compressed air supplied to the canceling air port 38.

In an illustrative embodiment, the pseudo finger 21 is made of a light-weight material and has slide friction of substantially zero by virtue of the air bearing described above. Moreover, the self weight of the pseudo finger 21 can be canceled by the supply of the compressed air to the canceling air port 38. Furthermore, the pressing force generated at the pseudo finger 21 is differentially controlled by the pressure applied to the thrust air port 37 and the pressure applied to the canceling air port 38. The electric pneumatic regulators 42 and 43 that control the respective pressures are of a high resolution type. As described above, the touch panel inspecting apparatus 1 can bring about a state in which the pseudo finger 21 is not substantially pressed against the touch panel 100 although the pseudo finger 21 is in contact with the touch panel 100.

The state of a contact at zero pressing force can be represented as "an ultimate soft touch", and can be utilized in various scenes which could not have been conceived heretofore. For example, in a case of inspecting a touch panel having characteristics varying by application of a mechanical load, the inspection can be conducted in a state in which the mechanical load is substantially eliminated, which is advantageous. As described above, the touch panel inspecting apparatus 1 according to an illustrative embodiment can considerably extend the set lower limit value of the pressing force of the pseudo finger 21.

In the touch panel inspecting apparatus 1 according to an illustrative embodiment, moreover, the user designates the magnitude of the pressing force to press the pseudo finger 21 against the touch panel 100 in the form of a set value, thereby pressing the pseudo finger 21 against the touch panel 100 with the designated pressing force. Accordingly, it is possible to conduct inspection assuming that the touch panel 100 is touched with various forces, in a considerably efficient manner.

The touch panel 100 to be inspected is electrically connected to the panel signal acquiring part 19 including a microcomputer and the like, via a connector and an electric wire. The panel signal acquiring part 19 acquires information about a pressed position of the touch panel 100 and the magnitude of the pressing force, by calculation based on a signal from the touch panel 100. The information thus acquired is transmitted to the control computer 15.

The control computer 15 compares the pressed position of the touch panel 100 and the magnitude of the pressing force of the pseudo finger 21 with the information thus acquired from the panel signal acquiring part 19, thereby determining whether or not the touch panel 100 is abnormal. Thus, it is possible to detect a defective touch panel with reliability.

FIG. 1 illustrates the touch panel inspecting apparatus 1 including the three pseudo fingers 21 arranged in parallel with the X axis. In a case of conducting the inspection with the three pseudo fingers 21 brought into contact with the touch panel 100 simultaneously, the direction of arranging the pseudo fingers 21 is preferably inclined relative to both the X and Y axes. Furthermore, controlling the turning motor 71 such that the direction of arranging the pseudo fingers 21 becomes parallel with a diagonal line of a lattice formed by transparent electrodes arranged in a matrix while reading, from the memory part 17, the pitch between the transparent electrodes arranged in rows and the pitch between the transparent electrodes arranged in columns in the touch panel 100 is preferable because inspection conducted in this condition has no deviation as compared with inspection conducted in the state in which the direction of arranging the pseudo fingers 21 is parallel with the X or Y axis.

As described above, the touch panel inspecting apparatus 1 according to an illustrative embodiment includes the workpiece holder 52, the pseudo finger 21, the X-Y movement mechanism 53, the memory part 17, the electric pneumatic regulators 42 and 43, and the panel signal acquiring part 19. The workpiece holder 52 allows the touch panel 100, which is an inspection target, to be set thereon. The pseudo finger 21 is contactable with the touch panel 100 set on the workpiece holder 52. The X-Y movement mechanism 53 allows the pseudo finger 21 to move relative to the touch panel 100. The memory part 17 stores therein a set value of pressing force of the pseudo finger 21, in a changeable manner. Each of the electric pneumatic regulators 42 and 43 regulates the pressing force to bring the pseudo finger 21 into contact with the touch panel 100, based on the set value stored in the memory part 17. The panel signal acquiring part 19 acquires an electric signal output from the touch panel 100.

Thus, the touch panel inspecting apparatus 1 can inspect the touch panel 100 while easily and flexibly changing the force to bring the pseudo finger 21 into contact with the touch panel 100, by changing the set value stored in the memory part 17. Accordingly, the touch panel inspecting apparatus 1 can quickly address a change of a touch panel to be inspected, a change of inspection conditions, and the like, and therefore can considerably improve inspection efficiency.

The touch panel inspecting apparatus 1 according to an illustrative embodiment also includes the canceling air passage 33 for applying, to the pseudo finger 21, force to bring the pseudo finger 21 apart from the touch panel 100.

Thus, the touch panel inspecting apparatus 1 can bring the pseudo finger 21 into contact with the touch panel 100 with force lighter than the self weight of the pseudo finger 21. Accordingly, the touch panel inspecting apparatus 1 can inspect the touch panel 100 under wider conditions than ever before.

In the touch panel inspecting apparatus 1 according to an illustrative embodiment, moreover, the memory part 17 is capable of storing a set value corresponding to zero pressing force of the pseudo finger 21.

Thus, the touch panel inspecting apparatus 1 can bring about a state in which the pseudo finger 21 is in contact with the touch panel 100 with the zero pressing force, by setting the pressing force of the pseudo finger 21 at zero. Accordingly, the touch panel inspecting apparatus 1 can inspect the touch panel 100 in a special state in which a mechanical load to be applied to the touch panel 100 is substantially eliminated.

The touch panel inspecting apparatus 1 according to an illustrative embodiment includes the housing 22, the bearing-forming air passage 31, the thrust air passage 32, and the canceling air passage 33. The housing 22 has the accommodating chamber 24 for accommodating the pseudo finger 21, and supports the pseudo finger 21 so as to allow the pseudo finger 21 to move linearly. The bearing-forming air passage 31 is a passage for compressed air to be supplied for forming a hydrostatic air bearing between the housing 22 and the pseudo finger 21. The thrust air passage 32 is a passage for compressed air to be supplied for acting, on the pseudo finger 21, force to bring the pseudo finger 21 close to the touch panel 100. The canceling air passage 33 is a passage for compressed air to be supplied for acting, on the pseudo finger 21, the force to bring the pseudo finger 21 apart from the touch panel 100. The electric pneumatic regulators 42 and 43 appropriately control the pressure of the compressed air supplied to the thrust air passage 32 and the pressure of the compressed air supplied to the canceling air passage 33, thereby regulating the pressing force to bring the pseudo finger 21 into contact with the touch panel 100.

Thus, the touch panel inspecting apparatus 1 forms the hydrostatic air bearing to substantially eliminate the slide friction of the pseudo finger 21 and to control the gas pressure at the thrust air passage 32 or the canceling air passage 33, thereby easily and flexibly regulating the pressing force of the pseudo finger 21. Moreover, the touch panel inspecting apparatus 1 can easily bring about a state in which the pseudo finger 21 is contact in with the touch panel 100 with considerably weak pressing force (or zero pressing force), by the differential control using the pressure at the thrust air passage 32 and the pressure at the canceling air passage 33.

The touch panel inspecting apparatus 1 according to an illustrative embodiment includes the plurality of pseudo fingers 21. The electric pneumatic regulators 42 and 43 can regulate, for each pseudo finger 21, the pressing force to bring the pseudo finger 21 into contact with the touch panel 100.

Thus, the touch panel inspecting apparatus 1 can inspect the touch panel 100 by bringing the plurality of pseudo fingers 21 into contact with the touch panel 100 simultaneously, and therefore can efficiently conduct the inspection.

An illustrative embodiment of the disclosure has been described above; however, the foregoing configuration may be modified as follows.

In place of the foregoing embodiment in which the pseudo finger 21 is directly brought into contact with the touch panel 100, a different member such as an inspection probe or a contact sensor may be fixed to the pseudo finger 21 or a different component may be held by the pseudo finger 21, and such a member or component may be brought into contact with the touch panel 100.

In the foregoing embodiment, the control computer 15 controls both the pressure at the thrust air passage 32 and the pressure at the canceling air passage 33 in order to realize the zero pressing force. In place of the foregoing embodiment, the control computer 15 may realize the zero pressing force by setting one of the pressures at a constant value and controlling the other pressure.

The number of pseudo fingers 21 is not limited to three, but may be two or at least four. Moreover, the number of pseudo fingers 21 may be one. If the number of pseudo fingers 21 is one, there is no necessity to turn the pseudo finger mechanism 55. Therefore, it is possible to omit the configuration including the turning motor 71 and the like.

The X-Y movement mechanism 53 may relatively move the pseudo finger 21. Accordingly, the relative movement of the touched position may be realized by movement of the touch panel 100 rather than the pseudo finger 21.

The foregoing disclosure has been specifically described and illustrated in connection with certain illustrative embodiments. However, it is clearly understood that the embodiments are by way of illustration and example only and are not to be taken by way of limitation. The spirit and scope of the invention are limited only by the terms of the appended claims.

What is claimed is:

1. An inspection apparatus comprising:
   a holder configured to set an inspection target on a front side of the holder, the inspection target configured to detect a first change from a no-contact condition to a contact condition on the inspection target by a human finger and/or a second change from the contact condition to the no-contact condition on the inspection target by the human finger, wherein the front side of the holder extends in an X-Y plane defined by an X-axis and a Y-axis, and wherein a Z-axis is defined as perpendicular to the X-Y plane;

one or more pseudo fingers, each configured be detected as the human finger by the inspection target, each of the one or more pseudo fingers being an elongated member;

a memory configured to store a respective value of a pressing force in a range of pressing forces, said range including a zero pressing force value, for each of the one or more pseudo fingers;

a positioner configured to linearly move at least one of the one or more pseudo fingers in a Z-axis direction, toward and/or away from the inspection target;

a housing comprising a chamber for accommodating the one or more pseudo fingers so that an upper portion of each of the one or more pseudo fingers is within the housing, wherein the one or more pseudo fingers are configured to linearly move relative to the housing;

a controller configured to regulate the pressing force for the at least one or more pseudo fingers by controlling the positioner based on the one or more respective values; and a sensor configured to acquire from the inspection target a first electric signal output indicating the first change and/or a second electrical signal output indicating the second change.

2. The inspection apparatus of claim 1, wherein the positioner is configured to move the at least one of the one or more pseudo fingers in an X-Y direction which is parallel to the X-Y plane and orthogonal to the Z-axis direction, while independently controlling the pressing force thereof based on the respective value.

3. The inspection apparatus of claim 2, wherein the pressing force is configured to be maintained constant during movement in the X-Y direction.

4. The inspection apparatus of claim 2, wherein the one or more pseudo fingers are configured to be held in the housing in a non-contact manner.

5. The inspection apparatus of claim 4, wherein the one or more pseudo fingers are configured to be held in the housing in a non-contact manner by an air bearing.

* * * * *